(12) United States Patent
Moya Muñoz

(10) Patent No.: US 10,118,837 B2
(45) Date of Patent: Nov. 6, 2018

(54) METHOD AND EQUIPMENT FOR THE TREATMENT OF WATER CONTAMINATED BY THERMAL OIL AND COLLECTION OF SAID OIL

(71) Applicant: PGMA, S.L.P., Cordova (ES)

(72) Inventor: Jose Juan Moya Muñoz, Cordova (ES)

(73) Assignee: PGMA, S.L.P., Cordova (ES)

( * ) Notice: Subject to any disclaimer, the term of this patent is extended or adjusted under 35 U.S.C. 154(b) by 68 days.

(21) Appl. No.: 15/309,285

(22) PCT Filed: Apr. 22, 2015

(86) PCT No.: PCT/ES2015/070333
§ 371 (c)(1),
(2) Date: Nov. 7, 2016

(87) PCT Pub. No.: WO2015/169990
PCT Pub. Date: Nov. 12, 2015

(65) Prior Publication Data
US 2017/0057837 A1    Mar. 2, 2017

(30) Foreign Application Priority Data
May 6, 2014  (ES) ................... 201430655

(51) Int. Cl.
*C02F 1/22* (2006.01)
*B01D 17/02* (2006.01)
*C02F 1/40* (2006.01)
*C02F 1/28* (2006.01)
*C02F 1/00* (2006.01)
*B01D 17/00* (2006.01)
*C02F 101/32* (2006.01)
*C02F 103/34* (2006.01)

(52) U.S. Cl.
CPC ............ *C02F 1/22* (2013.01); *B01D 17/0202* (2013.01); *B01D 17/10* (2013.01); *C02F 1/004* (2013.01); *C02F 1/28* (2013.01); *C02F 1/283* (2013.01); *C02F 1/40* (2013.01); *C02F 2101/32* (2013.01); *C02F 2103/34* (2013.01)

(58) Field of Classification Search
CPC ..... B01D 17/0202; B01D 17/10; C02F 1/004; C02F 1/22; C02F 1/28; C02F 1/283; C02F 1/40; C02F 2101/32; C02F 2103/34
See application file for complete search history.

(56) References Cited

U.S. PATENT DOCUMENTS

| 4,938,876 A  * | 7/1990 | Ohsol ................... B01D 17/00 210/177 |
| 2013/0118890 A1* | 5/2013 | Martin Sanchez ...... B01D 3/00 203/39 |

* cited by examiner

*Primary Examiner* — Dirk R Bass

(57) ABSTRACT

The invention relates to a method for the treatment of water contaminated by thermal oil and collection of said oil (for example, a eutectic mixture of biphenyl and diphenyl oxide), formed by a cooling phase (2) for cooling (to a temperature between the freezing point of the thermal oil and that of water) the mixture (1) of water and thermal oil, followed by the collection (3) of the part (4) of frozen thermal oil (precipitated or in suspension) by means of mechanical filtering. The remainder of contaminated water is treated in absorption filters and in activated carbon adsorption filters. The equipment required to implement this method comprises a cooling unit, a unit for the separation of phases by means of mechanical filtering for the collection (3) of the frozen thermal oil part (4), a unit (6) of absorption filters and a unit (7) of adsorption filters (activated carbon unit).

8 Claims, 1 Drawing Sheet

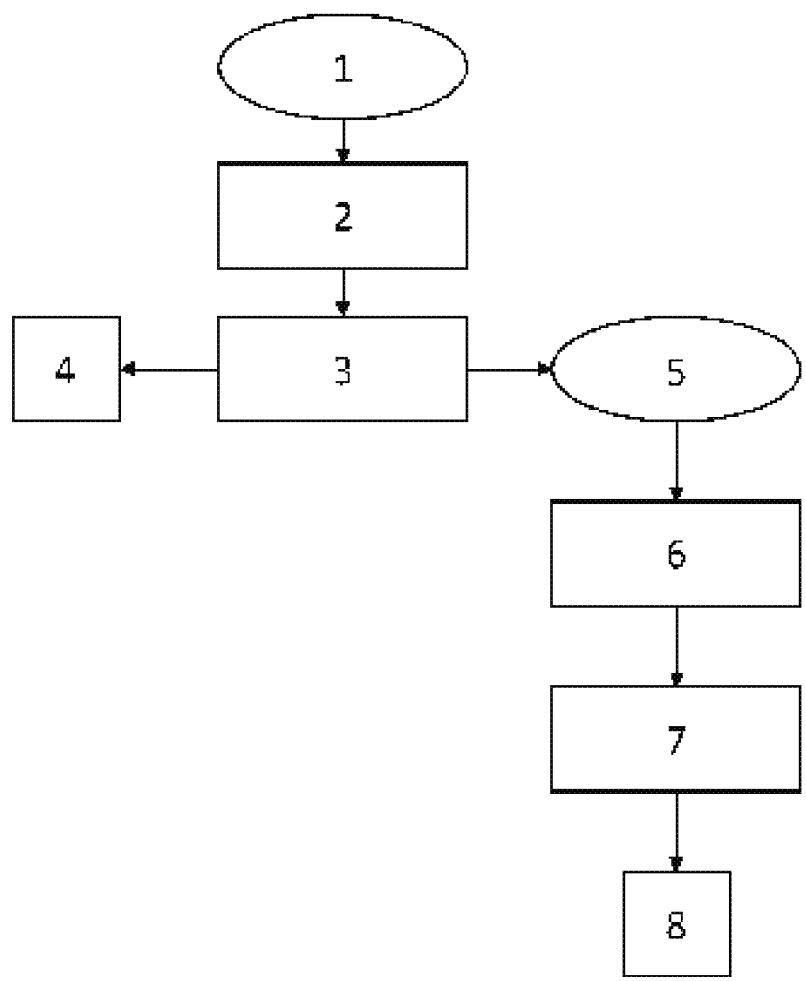

METHOD AND EQUIPMENT FOR THE TREATMENT OF WATER CONTAMINATED BY THERMAL OIL AND COLLECTION OF SAID OIL

RELATED APPLICATIONS

This application is a National Phase of PCT Patent Application No. PCT/ES2015/070333 having International filing date of Apr. 22, 2015, which claims the benefit of priority of Spanish Patent Application No. P201430655 filed on May 6, 2014. The contents of the above applications are all incorporated by reference as if fully set forth herein in their entirety.

FIELD AND BACKGROUND OF THE INVENTION

The present invention relates to a method for the treatment of water contaminated by thermal oil and collection of the thermal oil, after being accidentally discharged in water. An example of thermal oil would be that used in solar thermal elements as a heat transmission medium (Heat Transfer Fluid, HTF).

It is applicable in the renewable energies and industrial water treatment industries.

Thermal oil is normally used at solar thermal power plants as a heat transmitter, constituting the fluid used to transfer the heat captured from solar radiation by means of parabolic cylinders.

Accidental spills of thermal oil on floors or in water at a solar thermal power plant are inevitable in many cases, constituting an environmental and health and safety problem for workers. At many power plants, water contaminated by thermal oil is currently evacuated by means of an unauthorised management company, since it is hazardous waste. The cost of this removal is high and in no case does the solar thermal power plant collect the spilled thermal oil, with the added economic loss entailed.

However, if it is not removed by means of an authorised management company, different water treatment techniques can be applied:

Treatment using active carbon filters: this technique does not collect the thermal oil and adapts poorly to changes in the concentration of the pollutant, due to being difficult to plan the time the contaminated water is retained in the filter. Additionally, the filter may be prematurely saturated as a result of the adsorption of the undiluted thermal oil. The effectiveness of the filter is not optimised.

Treatment using grease separators: it is very difficult to collect the thermal oil using this technique. It is not used to collect oil. In many cases, the contaminated water is finally diluted so that the outflow parameters fulfil the standard. It does not have optimum results.

Coalescent filters, membranes, etc.: on their own they have poor results, due to which they are usually supplemented by active carbon filters. Likewise, it is difficult to collect the thermal oil using them.

An example of used thermal oil would be a eutectic mixture of biphenyl ($C_{12}H_{10}$) and diphenyl oxide ($C_{12}H_{10}O$), which adopts different states in water depending on the temperature thereof. This thermal oil is highly toxic to aquatic organisms and can have long-term negative effects on the environment. Likewise, it irritates the airways and skin, and its decomposition can generate traces of benzene and phenol, which are also toxic.

Therefore, the oil must be prevented from reaching the environment.

The applicant is not aware of any solution that enables the efficient collection of the thermal oil in the contaminated water treatment process using said solution. Neither is the applicant aware of an optimised treatment process for water contaminated with thermal oil.

SUMMARY OF THE INVENTION

The invention consists of a method for the treatment of water contaminated by thermal oil and collection of said oil, in addition to the equipment for carrying out both actions, as defined in the claims.

That is, the invention relates to a method for the collection of thermal oil used in solar thermal equipment and for the treatment of contaminated water, which is composed of at least three stages. Firstly, the water and oil mixture is cooled to below the freezing temperature of the oil. This cooling shall never be below the freezing point of water (0° C.). Next, the thermal oil precipitated or in suspension in the cooled contaminated water is collected. It is then taken to the final contaminated water treatment, which can be by means of an absorption filter and, next, an activated carbon adsorption filter.

Collection may comprise mechanical filtering, accompanied or not accompanied by other options, for example by means of a series of metal filters graded in descending order, down to a mesh size of 25 μm. The crystallisation of the thermal oil will aid this collection. Additionally, the useful life of the filter will be extended due to having to remove a smaller amount of thermal oil.

The cooling will depend on the thermal oil to be separated, but in the case of a eutectic mixture of biphenyl and diphenyl oxide, it is advisable for the temperature of the mixture to be below the freezing point of oil (12° C.), preferably between 0° C. and 5° C. and, more preferably, 3° C. to 4° C. Other thermal oils will use this or other temperature ranges.

The invention also relates to the equipment for carrying out the aforementioned method for the collection of thermal oil and treatment of water contaminated by the thermal oil. It will therefore and consecutively comprise: a cooling unit capable of cooling the mixture to the indicated temperatures; a phase separation unit (mechanical filtering), that will include the aforementioned metal filters for collecting the part of thermal oil precipitated or in suspension in the contaminated water; and contaminated water treatment elements, normally an absorption filter unit; and an adsorption filter unit (active carbon unit).

BRIEF DESCRIPTION OF THE SEVERAL VIEWS OF THE DRAWINGS

For the purpose of making the invention more readily understandable, FIG. 1 has been included, which shows the method for treating water contaminated by thermal oil and collection thereof.

DESCRIPTION OF SPECIFIC EMBODIMENTS OF THE INVENTION

What follows is a brief description of an embodiment of the invention, by way of illustration and not limitation, using the attached FIGURE as a reference.

In order to collect the thermal oil and treat the water, the water treatment and oil collection process has a first phase common to both objectives, which is cooling (2).

The mixture (1) of contaminated water and thermal oil is cooled to a temperature lower than the freezing point of thermal oil. In this manner, the non-soluble part of the thermal oil solidifies in water. On solidifying, it precipitates at the bottom of the enclosure where cooling takes place (2), whereupon this part (4) of the thermal oil can be collected (3), which is greater in economic terms than the part that remains in the contaminated water (5). Additionally, the treatment of the water becomes cheaper upon having removed part of the thermal oil.

The remainder of the thermal oil in the water remains dissolved or in the form of traces. Thanks to the cooling (2), it favours the formation of crystals of the dissolved fraction of water, which will optimise the subsequent treatment method.

Cooling (2) can take place in multiple ways.

In order for the contaminated water (5) to flow out of the cooling chamber with the remainder of the dissolved thermal oil, metal filters graded in descending order, down to a mesh size of 25 μm, will be disposed. These filters will aid the collection (3) of the solidified thermal oil.

The method is aided by pumps, so that the water circulates under pressure and can penetrate all the filters, with the ensuing pressure drop.

The temperature up to which the oil and water mixture (1) must be cooled depends on the degree of effectiveness to be achieved in the treatment process. Reducing it to below its freezing point will allow collection thereof.

In the case of the eutectic mixture of biphenyl and diphenyl oxide, the freezing temperature is 12° C., below which the thermal oil can be collected. Better results are obtained below 5° C., but guaranteeing the non-freezing of the water. An optimum working temperature for this thermal oil would be 3° C. to 4° C.

Upon completing the cooling phase, the frozen thermal oil can be removed by means of the aforementioned mechanical filtering process, for the subsequent reuse thereof. In this manner, the collection objective of most (4) of the thermal oil discharged into the water will have been achieved. The contaminated water will continue to a treatment phase such as that described below.

In order to proceed to treat the contaminated water (5), the method continues with its flow through oil absorption filters (6). The absorption filters (6) can be radial (such as those marketed under the brand OilBlock (produced by Twin Filter B.V., The Netherlands)), to absorb the thermal oil, which is aided by the water temperature, which has caused the thermal oil to crystallise. In this manner, it is not difficult to obtain filtering performances of approximately 99%.

In turn, the result, after precipitation by cold and filtering by absorption, has a very homogeneous pollutant concentration, practically independent from the initial amount of thermal oil, thereby optimising the following phase, passage through the adsorption filters comprised in an active carbon unit (7).

In the active carbon unit (7) the odours and colours of the water, and the possible remainder of contamination of the water, are removed by means of adsorption. As in the previous phase, the performance of the active carbon increases upon coming into contact with the cold water.

Due to the homogenisation of the concentration of the contamination on flowing out during the absorption filtering phase, stable retention times can be established in the active carbon unit, the last phase not being subject to concentration fluctuations. Likewise, it will allow better planning for the replacement or regeneration of the active carbon once it is saturated.

Upon flowing out during the absorption filter phase, the concentration of the thermal oil in the water is very small, due to which the adsorption filters and residence times therein to obtain values below the environmental standards can be designed. The product can already be considered treated water (8).

Therefore, the equipment required to carry out this method will comprise a cooling unit, phase separation unit (mechanical filtering) for collecting (3) the part (4) of thermal oil precipitated or in suspension in the contaminated water (5), an absorption filter unit (6) and an adsorption filter unit (active carbon unit (7)).

What is claimed is:

1. A method for the treatment of water contaminated by thermal oil and collection of said oil, of the type used in solar thermal equipment and with a freezing temperature of the thermal oil above 0° C., of a mixture (1) of thermal oil and water, characterised in that it comprises the stages of:
    a) Cooling (2) of the mixture (1) below the freezing temperature of the oil;
    b) Collection (3) of the part (4) of thermal oil precipitated or in suspension in the contaminated water (5);
    c) Treatment of the contaminated water (5).

2. The method, according to claim 1, characterised in that the treatment of the contaminated water (5) is carried out by means of the following stages:
    a) Absorption filtering of the contaminated water (5);
    b) Adsorption filtering, using active carbon, of the contaminated water from the absorption filter (6).

3. The method, according to claim 1, characterised in that the collection of the thermal oil part (4) comprises mechanical filtering.

4. The method, according to claim 3, characterised in that the mechanical filtering comprises a series of metal filters graded in descending order, down to a mesh size of 25 μm.

5. The method, according to claim 1, characterised in that cooling is performed down to a temperature of between 0° C. and 12° C.

6. The method, according to claim 5, characterised in that cooling is performed down to a temperature of between 0° C. and 5° C.

7. The method, according to claim 6, characterised in that cooling is performed down to a temperature of between 3° C. and 4° C.

8. The method, according to claim 1, characterized in that the thermal oil is a eutectic mixture of biphenyl and diphenyl oxide.

* * * * *